United States Patent

Matsuyama et al.

[11] Patent Number: 4,824,731
[45] Date of Patent: Apr. 25, 1989

[54] THIN FILM MAGNETIC HEAD

[75] Inventors: Haruhiko Matsuyama, Hiratsuka; Fusaji Shoji, Yokohama; Shunichiro Kuwatsuka; Kenji Sugimoto, both of Odawara, all of Japan

[73] Assignee: Hitachi, Ltd., Tokyo, Japan

[21] Appl. No.: 149,560

[22] Filed: Jan. 28, 1988

[30] Foreign Application Priority Data

Feb. 2, 1987 [JP] Japan .................. 62-20447

[51] Int. Cl.$^4$ .............................. G11B 5/40
[52] U.S. Cl. ..................... 428/473.5; 360/119; 360/120; 360/125; 360/126; 428/694; 428/900
[58] Field of Search ............... 427/131, 128; 428/473.5, 694, 695, 900; 360/120, 125, 126, 119

[56] References Cited

U.S. PATENT DOCUMENTS

| 4,657,812 | 4/1987 | Hatanai ................. 428/328 |
| 4,686,147 | 8/1987 | Matsuyama ........... 427/131 |
| 4,695,512 | 9/1987 | Hatanai ................. 427/131 |

*Primary Examiner*—Paul J. Thibodeau
*Attorney, Agent, or Firm*—Antonelli, Terry & Wands

[57] ABSTRACT

A thin film magnetic head of which the insulation layer is made of a polyimide resin obtained by heat-curing a polyimide precursor represented by the following general formula (I) or (II) or a mixture thereof not only has excellent characteristics with respect to the insulation layer, i.e. satisfactory flatness, high glass transition temperature and excellent adhesiveness but also is free from film defects, i.e., exhibits high reliability:

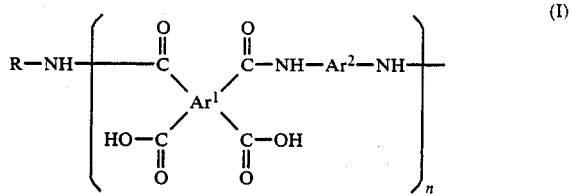

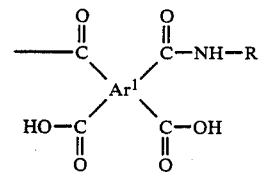

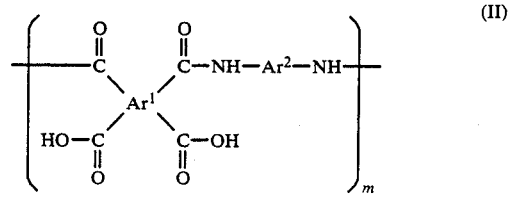

wherein R is, e.g.,

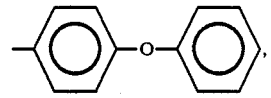

$Ar^1$ is, e.g.,

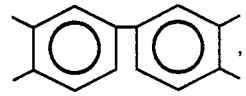

$Ar^2$ is, e.g.

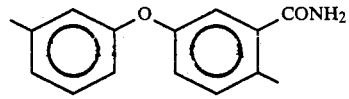

n is an integer of 1 to 100, and m is an integer of 10 to 500.

17 Claims, 2 Drawing Sheets

THIN FILM MAGNETIC HEAD

BACKGROUND OF THE INVENTION

This invention relates to a thin film magnetic head, particularly a thin film magnetic head of which the insulation layer is made of a polyimide resin.

Japanese Patent Laid-Open Nos. 135713/1977 and 93113/1981 proposed a thin film magnetic head of which the insulation layer was made of a polyimide resin obtained by heat curing a condensation or addition polymerization type polyimide precursor.

When a polyimide resin obtained by heat-curing a condensation or addition polymerization type polyimide precursor is used in the insulation layer of a thin film magnetic head, the insulation layer can be easily formed by a method comprising a step of coating and a step of heat curing, which method is superior in mass productivity to the formation of an inorganic insulation layer by vacuum deposition, sputtering deposition, etc. Further, the insulation layer thus obtained is superior in insulating properties and heat resistance to other organic insulation films.

However, the above-mentioned prior art had the following problems and, therefore, was unsatisfactory for practical use.

Specifically, since it is difficult for the condensation polymerization type polyimide precursor to melt during heat curing, unevennesses corresponding to the difference in levels due to the presence of a coil on a substrate are formed on the surface of the polyimide resin insulation layer. This in turn brings about the formation of an uneven magnetic film on the insulation layer, which makes it impossible to attain high permeability.

On the other hand, since the addition polymerization type polyimide precursor is poor in solubility in a solvent, an insoluble component is present in a solution of the precursor, which makes it difficult to form a uniform coating film. Therefore, this precursor is unsatisfactory for practical use, also.

Further, all the resins obtained by heat-curing the above-mentioned polyimide precursors are poor in adhesiveness, which leads to a problem with respect to reliability of the formed magnetic head.

Moreover, in the above-mentioned prior art, no sufficient consideration is given to the conditions under which an upper magnetic film is formed on the insulation layer. That is, the prior art also had a problem that no wide margin could be provided with respect to the temperature of formation of the upper magnetic film.

A permalloy (Ni-Fe alloy having high permeability exhibiting high permeability at a high-frequency region is generally used for the magnetic film of the thin film magnetic head. The permalloy film is formed by a plating, deposition or sputtering method. Among these methods, the deposition and sputtering methods are suitable for the formation of a magnetic film having excellent magnetic characteristics because the composition of the film to be formed can be easily controlled. However, in the deposition and sputtering methods, the substrate should be heated at a relatively high temperature, i.e. 280° to 350° C., in forming the permalloy film. For this reason, according to the studies conducted by the present inventors, the insulation layer on which the permalloy film is formed should have a high glass transition temperature. When the glass transition temperature is remarkably lower than the temperature of the substrate, the interlayer insulation layer exhibits rubber elasticity during the formation of the upper magnetic film. Therefore, the interlayer insulation layer undergoes deformation, such as buckling or protuberance of the edge portion of the film, due to the stress of the permalloy film serving as an upper magnetic film. All of these phenomena are factors causing the deterioration of the characteristics of the thin film magnetic head.

Further, the condensation polymerization type polyimide precursor forms water molecules when it undergoes a condensation reaction. The water molecules bring about defects, such as blisters, in the insulation layer, which often leads to the breaking or short-circuiting of a conductor provided in the thin film magnetic head.

As described above, the conventional thin film magnetic head in which the insulation layer is made of a polyimide resin is accomplished by the following serious problems: (i) insufficient flatness of the formed polyimide layer and (ii) occurrence of deformation during the formation of the upper magnetic film because of its low glass transition temperature (lower than 280° C.). Further, it also has the following drawbacks: (iii) low adhesiveness and (iv) frequent occurrence of defects, such as blisters, due to the presence of water molecules.

An invention previously filed with the U.S. Patent and Trademark Office by some of the present inventors [filed on Feb. 18, 1986 with the U.S. Patent and Trademark Office under Application Ser. No. 829,824 which is now U.S. Pat. No. 4,686,147 (issue date: Aug. 11, 1987)] improved the flatness of the above item (i) but provided no improvement in the above item (ii) because the glass transition temperature of the resin used was lower than 280° C. The above-described U.S. Patent corresponds to Japanese Patent Laid-Open Nos. 24408/1987 and 188712/1986.

SUMMARY OF THE INVENTION

An object of the present invention is to eliminate the drawbacks of the above-mentioned prior art and to provide a thin film magnetic head which has an insulation layer having a smooth surface and excellent adhesiveness, is free from film defects, and exhibits a high yield of production and high reliability.

The above-described object can be attained by a thin film magnetic head provided with an insulation layer made of a polyimide resin produced by heat-curing a polyimide precursor, i.e. a polyamic acid, represented by the following general formula (I) or (II), or a mixture thereof:

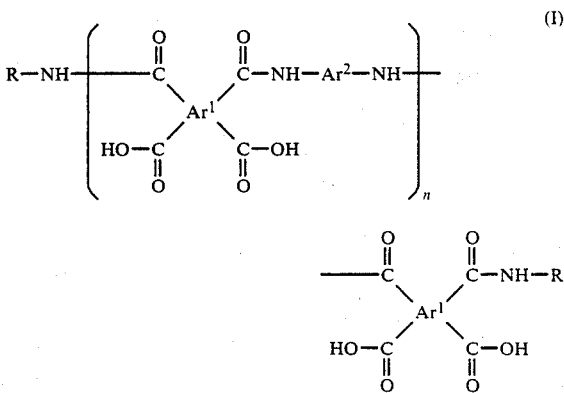

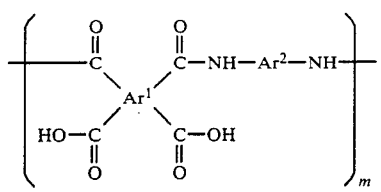 (II)

wherein R is at least one radical selected from among

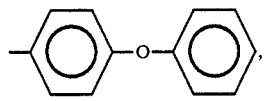,

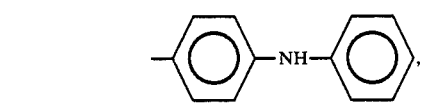,

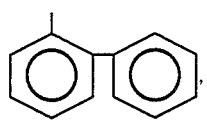,

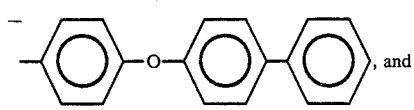, and

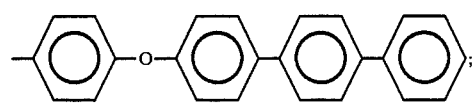;

Ar¹ is at least one radical selected from among

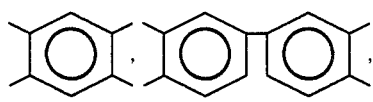,

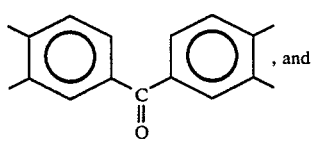, and

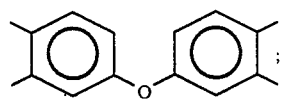;

Ar² is at least one radical selected from among

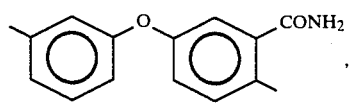,

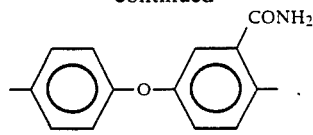,

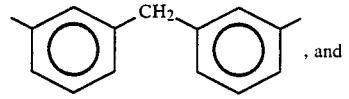, and

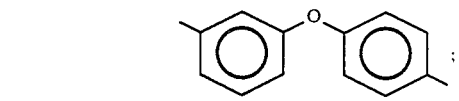;

n is an integer of 1 to 100; and m is an integer of 10 to 500.

Ar² is particularly preferably

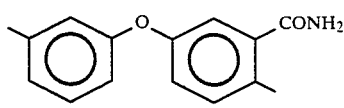

from the standpoint of the flatness and glass transition temperature. R is more preferably

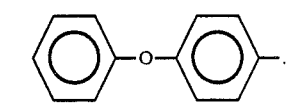.

Ar¹ is more preferably

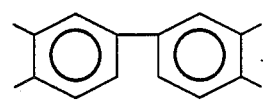.

When a mixture of the polyimide precursors represented by the above-described general formulae (I) and (II) is used, the mixing ratio in terms of weight ratio of solid content of both precursors is preferably represented by the following equation:

$$\left(\begin{array}{c}\text{polyimide precursor}\\ \text{represented by the}\\ \text{above general}\\ \text{formula (I)}\end{array}\right) \bigg/ \left(\begin{array}{c}\text{polyimide precursor}\\ \text{represented by the}\\ \text{above general}\\ \text{formula (II)}\end{array}\right) = 5/95 \text{ to } 95/5 \quad \text{(III)}$$

The mixing ratio is more preferably 20/80 to 80/20.

The polyimide precursors represented by the above general formulae (I) and (II) are highly soluble in a solvent and, therefore, can be converted into a varnish of polyamic acid having high homogeneity and high concentration, which facilitates formation of a thick film.

In the present invention, the thin film magnetic head to which the above-described polyimide resin has been applied has a structure comprising a substrate and, superimposed on the substrate in the following order, a first magnetic layer, an insulating gap layer, a first insulation layer, a conductor layer, at least one insulation layer (which is provided in the following order from the side of the substrate: a second insulation layer, a third insulation layer, .....), and a second magnetic layer. Among the interlayer insulation layers such as the first and the second insulation layers, at least the uppermost insulation layer is made of a polyimide resin produced by heat-curing the above-mentioned polyimide precursor. The interlayer insulation layer generally comprises the first and second insulation layers or the first, second, and third insulation layers. When a plurality of insulation layers are provided after formation of a conductor layer, i.e. when the third or higher insulation layer is provided and the lower insulation layers, i.e. first and the second insulation layers, are made of a substance other than the resin produced by heat-curing the above-described polyimide precursor, it is preferred that the upper insulation layer formed by heat-curing the above-described polyimide precursor have a thickness of 1 to 4 μm. When the layer is too thick, the magnetic characteristics of the thin film magnetic head are deteriorated, while when the layer is too thin, no sufficient effect of the present invention can be attained.

The curing heat treatment of the above-described polyimide precursor may be conducted in the air, more preferably in a non-oxidizing atmosphere, e.g., in an inert gas such as argon or nitrogen or under a reduced pressure of 0.1 Pa or less. Particularly, the curing heat treatment of a polyimide precursor containing a polyamic acid represented by the above-mentioned general formula (I) under a reduced pressure of 0.1 Pa or less enables the removal of water molecules, which leads to very favorable results.

If necessary, a protective layer is further provided on the second magnetic layer.

DETAILED DESCRIPTION OF THE PREFERRED EMBODIMENTS

Figure 1:
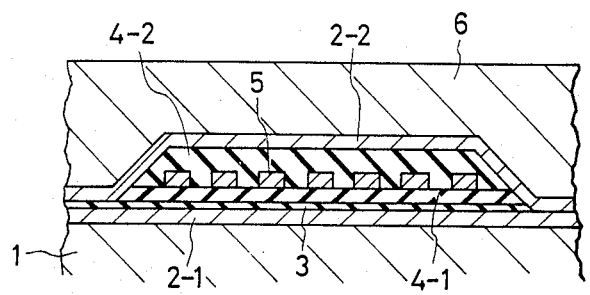
FIG. 1 is a partial sectional view of one form of a thin film magnetic head.

The present invention will now be described in more detail.

Preferably examples of the solvent for the above-described polyimide precursor include polar solvents such as N-methyl-2-pyrrolidone, benzylpyrrolidone, N,N-dimethylacetamide, dimethylformamide, and dimethyl sulfoxide. Particularly, when spin coating which will be described later is conducted, N-methyl-2-pyrrolidone and N,N-dimethylacetamide are preferable. The concentration of the varnish of polyamic acid is usually 10 to 50% by weight, more preferably 15 to 35% by weight. When the concentration is lower than 10% by weight, it is difficult to form a thick coating film. On the other hand, when the concentration is higher than 50% by weight, the viscosity is too high, which makes it difficult to form a coating film having a uniform thickness on the surface of the substrate.

The insulation layer of the magnetic head is formed by applying the above-mentioned varnish of polyamic acid on a magnetic layer or a substrate provided with a conductor layer and having unevennesses and subjecting the resulting coating film to a curing heat treatment, thereby forming a polyimide resin film.

Examples of the coating method include a spin coating method, a roll coating method, a dipping method, and a printing method. In order to uniformly form a coating film on the whole surface of a substrate with high productivity, the spin coating method is most preferable. The curing heat treatment is conducted at a temperature of 140° to 400° C., preferably 250° to 400° C. for a period of 10 to 180 min, preferably 30 to 120 min. The polyimide resin formed by the heat curing treatment has excellent adhesiveness to the substrate, etc.

As described above, the formation of at least the uppermost insulation layer among a plurality of interlayer insulation layers in the core of a thin film magnetic head with a polyimide resin produced by heat-curing at least one compound selected from among the polyimide precursors represented by the above general formulae (I) and (II) realized not only the formation of an insulation layer having excellent flatness, free from film defects and having excellent thermal resistance, but also the production of a thin film magnetic head having high reliability with a high yield of production. The formation of the uppermost insulation layer with a resin produced by heat-curing at least one polyimide precursor selected from among those represented by the above general formulae (I) and (II) is suitable for mass production of devices, because the polyimide precursor is highly soluble in a solvent and, therefore, can be converted into a varnish of polyamic acid having high homogeneity and high concentration, thus facilitating formation of a thick coating film.

Further, when the uppermost insulation layer has a glass transition temperature of 280° C. or above, it functions as a layer which suppresses the deformation of the whole insulation layers due to the stress of the permalloy film caused during the formation of the upper magnetic film, which contributes to the prevention of the occurrence of defects. In the present invention, the glass transition temperature of the polyimide resin obtained by heat curing the above-described polyimide precursor is 280° C. or above.

Further, the heat-curing treatment of the polyimide precursor under a reduced pressure of 0.1 Pa or less eliminated the risk of causing film defects such as blisters.

A preferred embodiment of the thin film magnetic head of the present invention is shown in FIG. 1, which is a partial sectional view of a thin film magnetic head. This thin film magnetic head comprises a substrate 1 and, superimposed on the substrate in the following order, a first magnetic layer 2-1 made of permalloy etc., an insulating gap layer 3, a first insulation layer 4-1 obtained by the heat curing of a polyimide precursor represented by the above general formula (I), a conductor 5 made of aluminum, copper, gold or the like, a second insulation layer 4-2 having the same composition as that of the first insulation layer 4-1, a second magnetic layer 2-2, and a protective layer 6 made of an inorganic insulation material such as alumina. This magnetic head is a single-layer coil magnetic head. A multilayer, multiturn coil magnetic head can be produced by alternately forming a conductor layer and an insulation layer on the second insulation layer. The patterning of the insulation layer may be conducted by making use of a well-known etching solution of a hydrazine hydrate system. In addition, the patterning may also be conducted by means of an oxygen plasma.

Figure 3:
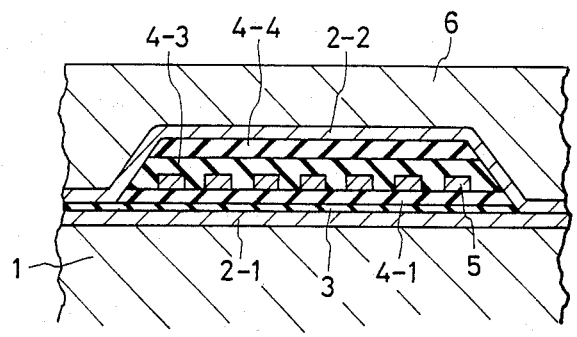
FIG. 3 is a partial sectional view of another form of a thin film magnetic head.

Further, the second insulation layer 4-2 in FIG. 1 may be of a double layer structure, i.e. may be replaced with the second insulation layer 4-3 and the third insulation layer 4-4 as shown in FIG. 3. These insulation layers may be formed by the heat curing of a polyimide precursor represented by the above general formula (I).

Among these insulation layers, only the uppermost insulation layer, i.e. the second insulation layer 4-2 in FIG. 1 and the third insulation layer 4-4 in FIG. 3, may be formed from a polyimide precursor represented by the above general formula (I).

Figure 4:
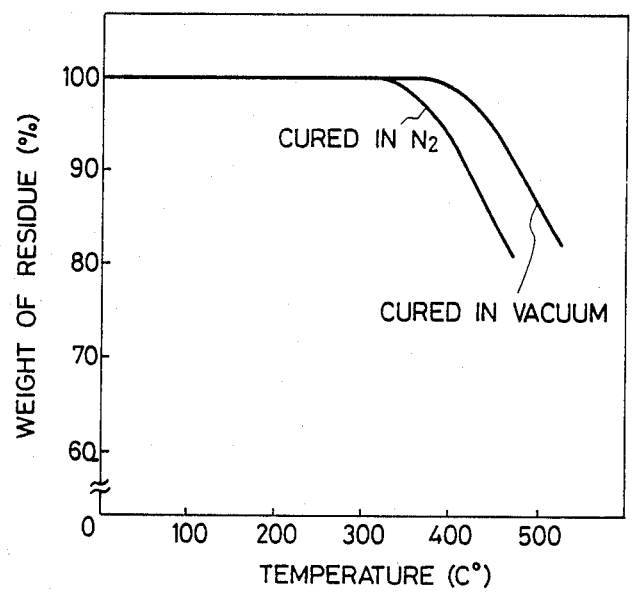
FIG. 4 is a thermogravimetric curve showing the results of a thermogravimetric analysis on the heat curing of a condensation polymerization type polyimide precursor in a nitrogen gas or in vacuo.

The polyimide precursor may be those represented by the above general formula (I) or (II) or a mixture of those represented by the above general formulae (I) and (II). As described above, the heat-curing treatment of the polyimide precursor in vacuo is effective in eliminating the film defects. The reason why the insulation film cured in vacuo has heat resistance remarkably improved over that of the insulation film cured in the air or in an inert gas atmosphere can be understood from a thermogravimetric curve as shown in FIG. 4, which is a thermogravimetric curve showing the effect of atmosphere used for heat-curing the polyimide precursor on the heat resistance of the polyimide.

The present invention will now be described in more detail with reference to the following examples.

EXAMPLE 1

The present example will be described with reference to FIG. 1.

On an Al$_2$O$_3$-TiC (a mixed sinter comprising alumina and titanium carbide) substrate 1 having a thickness of 4 mm and a diameter of 3 inches on the surface of which alumina had been deposited by sputtering so as to have a thickness of 10 $\mu$m was deposited 2 $\mu$m-thick permalloy at a substrate temperature of 280° C. by sputtering. A pattern was formed thereon by a photo-etching method to form a first magnetic layer 2-1. Thereafter, a 0.5 $\mu$m-thick alumina was deposited by sputtering, followed by the formation of a pattern by the photoetching method, thereby forming an insulating gap layer 3.

An N,N-dimethylacetamide solution of a polyamic acid represented by the above formula (IV) (resin content: 30% by weight) was applied by spin coating on the substrate on which the insulating gap layer had been formed, followed by heat curing under a reduced pressure of $10^{-3}$ to $10^{-4}$ Pa. The heat curing was conducted at 200° C. for 30 min and then at 350° C. for 30 min. The resulting cured film had a glass transition temperature of 280° C.

A predetermined pattern having a thickness of 1.5 $\mu$m was formed on the cured film by the photoetching method in which an etching solution comprising a hydrazine hydrate system [hydrazine hydrate/ethylenediamine =7/3 (volume ratio] is used, thereby forming a first insulation layer 4-1. Then, 1.5 $\mu$m-thick copper was deposited on the first insulation layer 4-1, followed by formation of a pattern by the photoetching method, thereby forming a conductor 5. Thereafter, a 4 $\mu$m-thick second insulation layer 4-2 was formed thereon in the same manner as that described above with respect to the formation of the first insulation layer 4-1. Further, a 2 $\mu$m-thick second magnetic layer 2-2 was formed thereon in the same manner as that described above with respect to the formation of the first magnetic layer 2-1. Finally, 30 $\mu$m-thick alumina was deposited by sputtering to form a protective layer 6.

The second magnetic layer 2-2 of the thin film magnetic head thus produced had a very flat surface (height of an undulation: 0.10 $\mu$m or less). In other words, a thin film magnetic head having a high permeability and excellent magnetic characteristics could be obtained. Hereinafter, the height of an undulation will be referred to as "flatness".

Further, the insulation layer was free from film defects such as blisters. That is, a thin film magnetic head having excellent magnetic characteristics could be obtained. Because of the excellent heat resistance of the insulation layer, it does not undergo any change in properties by the action of heat applied during the formation of the magnetic layer by sputtering, which made it possible to raise the substrate heating temperature, thus enabling an improvement in the magnetic characteristics.

Further, the magnetic head device was applied to a heat cycle test under the conditions of 30 min at room temperature and 30 min at 350° C. In the test, the device experienced no film defect, such as peeling, i.e. exhib-

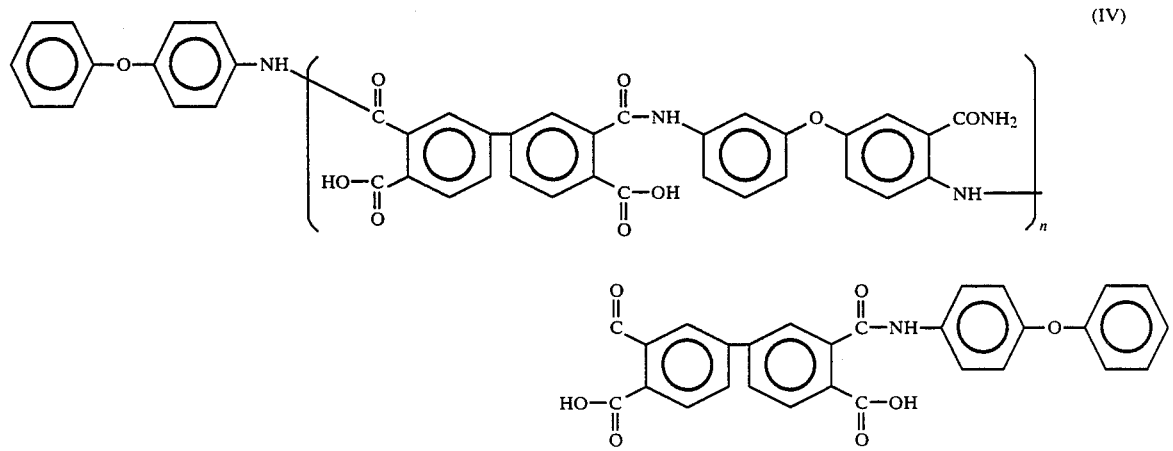

(IV)

wherein n is about 10.

ited excellent results with respect to reliability as well.

EXAMPLE 2

A thin film magnetic head was prepared in the same manner as that in Example 1, except that a polyimide precursor represented by the above general formula (I) was used. The thin film magnetic head thus obtained was subjected to determination of the flatness of the second magnetic layer 2-2 and the glass transition temperature of the cured film and was further examined with respect to the presence of blisters. The results are shown in Table 1. The radicals R, $Ar^1$ and $Ar^2$ in the general formula (I) and the solvent used were as shown in Table 1. Further, in Table 1, the concentration of the polyimide precursor in the solvent was expressed in terms of the resin content.

Thereafter, the same experiment as that described above was conducted, except that a mixed precursor obtained by mixing the polyimide precursor represented by the above general formula (II) with polyimide precursor No. 6 as shown in Table 1 (hereinafter referred to as [A]) in a weight ratio of solid content of 50/50 was used. The results are shown in Table 2. The radicals R, $Ar^1$ and $Ar^2$ in the general formula (II) and the solvent used were as shown in Table 2. Further, in Table 2, the concentration of the polyimide precursor represented by the general formula (II) in the solvent prior to the mixing with precursor No. 6 as shown in Table 1 was expressed in terms of the resin content.

Figure 2:
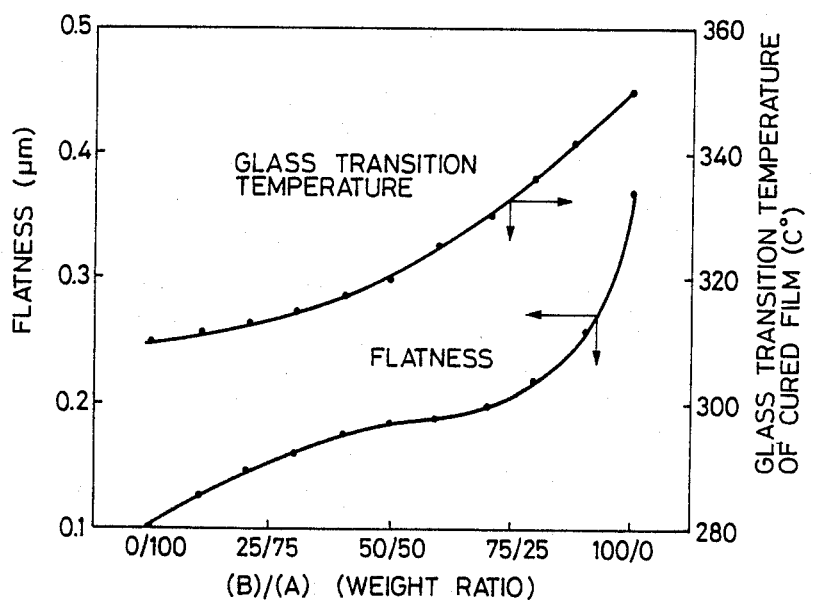
FIG. 2 is a graph showing the dependency of the flatness of a second magnetic layer and the glass transition temperature of an insulation layer upon the mixing ratio of polyimide precursors.

Further, the same experiment as that described above was conducted, except that mixed precursors obtained by mixing the polyimide precursor represented by mixing precursor [A] with polyimide precursor No. 4 as shown in Table 2 (hereinafter referred to as [B]) in various weight ratios were used, to determine the flatness and glass transition temperature. The results are shown in FIG. 2. As can be seen from FIG. 2, a mixing system having a [B] to [A] weight ratio of solid content of 20/80 to 8/20 exhibited a particularly excellent effect, i.e. exhibited a flatness of 0.22 μm or less and a glass transition temperature of the heat-cured film of 310° C. or above.

The thin film magnetic head formed by making use of these varnishes of polyamic acids in the same manner as that in Example 1 exhibited excellent characteristics as in the thin film magnetic head formed in Example 1.

EXAMPLE 3

Various varnishes of polyamic acids were prepared through various combinations of precursor Nos. 1 to 5, 7 and 8 with precursor Nos. 1 to 3 and 5 to 7 by mixing them in the same manner as that in Example 2. Thin film magnetic heads were prepared in the same manner as that in Example 1, except that the above-prepared varnishes of polyamic acids were used. These thin film magnetic heads exhibited excellent characteristics as in the thin film magnetic head prepared in Example 1.

TABLE 1

| No. | R | Ar¹ | Ar² | Solvent | Resin content (wt %) | Flatness (μm) | Glass transition temp. of cured film Tg (°C.) | Blistering |
|---|---|---|---|---|---|---|---|---|
| 1 | (phenyl-NH-phenyl-CH₃) | (phenyl ring) | (phenyl-O-phenyl-CONH₂, phenyl-CH₃) | N,N—dimethylacetamide | 30 | 0.10 | 280 | none |
| 2 | (biphenyl-CH₃) | (phenyl ring) | (phenyl-O-phenyl-CONH₂, phenyl-CH₃) | N,N—dimethylacetamide | 30 | 0.10 | 285 | none |
| 3 | (phenyl-O-phenyl-CH₃) | (phenyl ring) | (phenyl-O-phenyl-CONH₂, phenyl-CH₃) | N,N—dimethylacetamide | 30 | 0.10 | 280 | none |
| 4 | (phenyl-O-phenyl-CH₃) | (phenyl-C(=O)-phenyl) | (phenyl-O-phenyl-CONH₂, phenyl-CH₃) | N,N—dimethylacetamide/ N—methyl-2-pyrrolidone (1/1) | 20 | 0.10 | 280 | none |
| 5 | (phenyl-O-phenyl-CH₃) | (phenyl-O-phenyl) | (phenyl-O-phenyl-CONH₂, phenyl-CH₃) | N—methyl-2-pyrrolidone | 20 | 0.10 | 280 | none |
| 6 | (phenyl-O-phenyl-CH₃) | (two phenyl rings, molar ratio: 1/1) | (phenyl-O-phenyl-CONH₂, phenyl-CH₃) | N,N—dimethylacetamide | 30 | 0.10 | 310 | none |
| 7 | (phenyl-O-phenyl-CH₃) | (two phenyl rings, molar ratio: 1/1) | (phenyl-CH₂-phenyl-CH₃) | N,N—dimethylacetamide | 30 | 0.10 | 305 | none |
| 8 | (phenyl-O-phenyl-CH₃) | (two phenyl rings, molar ratio: 1/1) | (phenyl-O-phenyl-CH₃) | N,N—dimethylacetamide | 30 | 0.10 | 305 | none |

TABLE 2

| No. | Radicals of polyimide precursor represented by general formula (II) Ar¹ | Ar² | Solvent | Resin content (wt. %) | Flatness (μm) | Glass transition temp. of cured film (°C.) |
|---|---|---|---|---|---|---|
| 1 | [biphenyl structure] | [phenoxy-phenyl-CONH₂] | N,N—dimethylacetamide | 25 | 0.15 | 315 |
| 2 | [diphenyl ketone structure] | [phenoxy-phenyl-CONH₂] | N,N—dimethylacetamide | " | 0.15 | 315 |
| 3 | [diphenyl ether structure] | [phenoxy-phenyl-CONH₂] | N,N—dimethylacetamide | " | 0.15 | 315 |
| 4 | [biphenyl]/[phenyl] (molar ratio: 1/1) | [phenoxy-phenyl-CONH₂] | N,N—dimethylacetamide | " | 0.18 | 320 |
| 5 | [biphenyl]/[phenyl] (molar ratio: 1/1) | [phenyl-O-phenyl-CONH₂] | N,N—dimethylacetamide/ N—methylpyrrolidone (1/1) | " | 0.20 | 325 |
| 6 | [biphenyl]/[phenyl] (molar ratio: 1/1) | [phenyl-CH₂-phenyl] | N—methyl-2-pyrrolidone | 20 | 0.15 | 310 |
| 7 | [biphenyl]/[phenyl] (molar ratio: 1/1) | [phenyl-O-phenyl] | N,N—dimethylacetamide | 25 | 0.15 | 310 |

COMPARATIVE EXAMPLE 1

An addition polymerization type polyimide precursor (Thermid 600; a product of Gulf Oil Chemical Co.) was dissolved in N,N-dimethylacetamide (resin content: 15% by weight), followed by formation of an insulation layer of a thin film magnetic head in the same manner as that in Example 1. No uniform coating film could be obtained because of the presence of an insoluble component, which led to poor characteristics of the formed thin film magnetic head.

EXAMPLE 4

The present invention will now be described with reference to FIG. 3.

On an Al₂O₃-TiC substrate 1 having a thickness of 4 mm and a diameter of 3 inches on the surface of which alumina had been deposited by sputtering so as to have a thickness of 10 μm was deposited 2 μm-thick permalloy by sputtering. A pattern was formed thereon by the photoetching method to form a lower magnetic layer, i.e. a first magnetic layer 2-1. Thereafter, a 0.5 μm-thick alumina was deposited thereon by sputtering, followed by the formation of a pattern by the photoetching method, thereby forming an insulating gap layer 3. An N,N-dimethylacetamide solution of a polyamic acid represented by the following formula (V) (resin content: 30% by weight) was applied by spin coating on the substrate on which the insulating gap layer had been formed, followed by heat curing under a reduced pressure of $10^{-3}$ to $10^{-4}$ Pa:

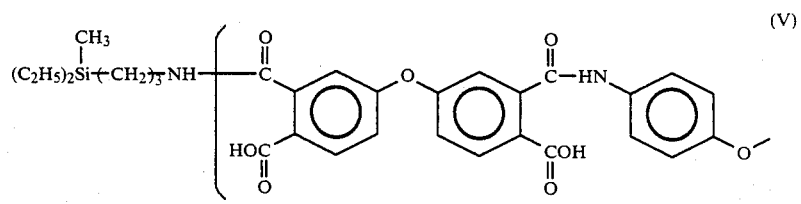
(V)

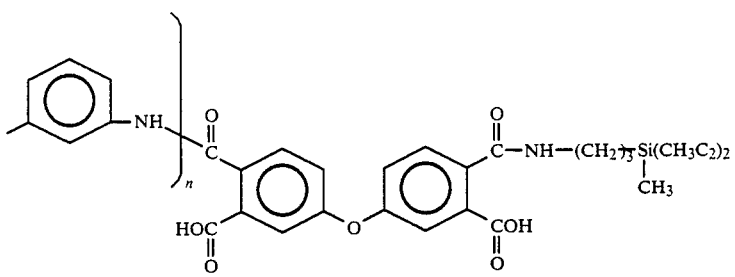

wherein n is about 10.

The heat curing was conducted at 200° C. for 30 min and then at 350° C. for 30 min.

The resulting cured film had a glass transition temperature of 240° C.

A predetermined pattern having a thickness of 1.5 μm was formed on the cured film by the photo-etching method by making use of an etching solution comprising a hydrazine hydrate system [hydrazine hydrate/ethylenediamine=7/3 (volume ratio)] to form a first insulation layer 4-1. Then, 1.5 μm-thick copper was deposited on the first insulation layer 4-1, followed by patterning through the photoetching method, thereby forming a conductor 5. Thereafter, a 4 μm-thick second insulation layer 4-3 was formed thereon in the same manner as that described above with respect to the formation of the first insulation layer 4-1. Then, an N-N-dimethylacetamide solution of a polyamic acid represented by the following formula (VI) or (VII) (resin content: 15% by weight) was applied thereon by spin coating, followed by heat curing under a reduced pressure of $10^{-3}$ to $10^{-4}$ Pa at 200° C. for 30 min and further at 350° C. for 30 min, thereby forming the uppermost insulation layer.

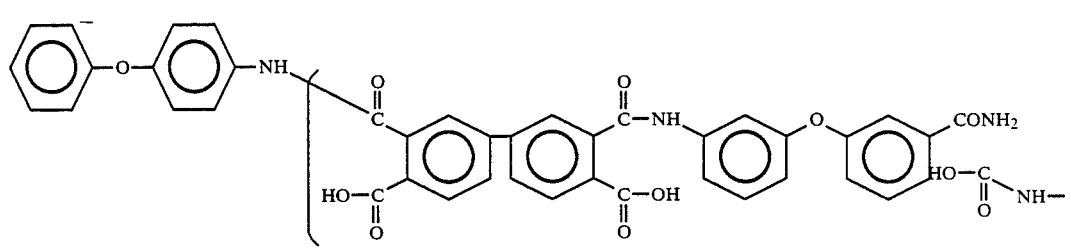 (VI)

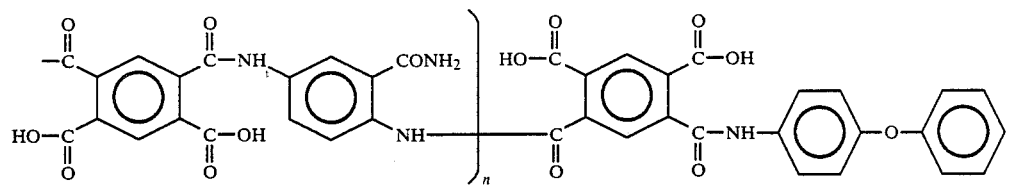

wherein m is about 15.

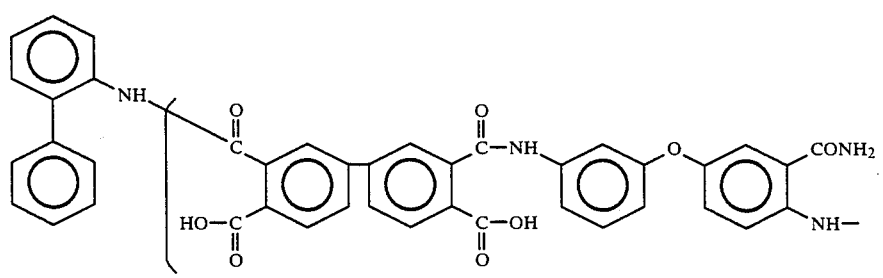 (VII)

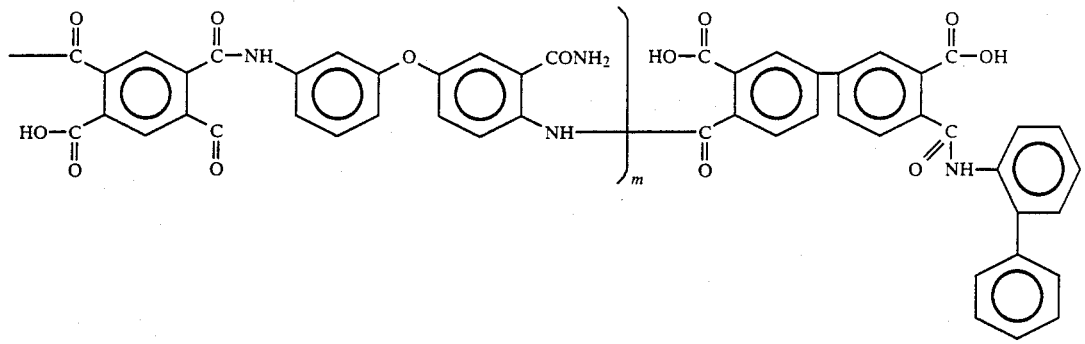

wherein m is about 15.

The cured film had a glass transition temperature of 305° C. Subsequently, a 1.5 μm-thick third insulation layer 4-4 was formed as the uppermost insulation layer by the photoetching method in the same manner as that described above with respect to the formation of the first insulation layer 4-1 and the second insulation layer 4-3. A 2 μm-thick second magnetic layer 2-2 was then formed thereon in the same manner as that described above with respect to the formation of the first magnetic layer 2-1. The substrate temperature was 280° C. when the sputtering was started and 300° C. when the sputtering was finished. Finally, 30 μm-thick alumina was deposited thereon by sputtering to form a protective layer 6.

The upper magnetic layer, i.e. the second magnetic layer 2-2, of the thin film magnetic head thus prepared had a very flat surface (height of an undulation: 1.5 μm or less). In other words, a thin film magnetic head having a high permeability and excellent magnetic characteristics could be obtained.

Then the magnetic head device was applied to a heat test at 375° C. for 60 min. In the test, the device experienced no film defect, such as peeling, i.e. exhibited excellent results with respect to reliability as well.

EXAMPLE 5

A thin film magnetic head was prepared in the same manner as that in Example 4, except that a polyimide precursor represented by the following formula (VIII) was used for formation of the uppermost insulation layer 4-3 as shown in FIG. 3:

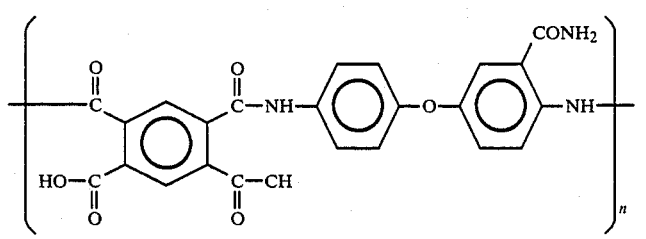
(VIII)

wherein n is about 100.

The insulation layer formed by heat curing of the precursor represented by the above formula (VIII) had a glass transition temperature of 350° C. Further, the upper magnetic layer 6 had a surface free from buckling and deformation of the edge portion thereof, i.e., had a very flat surface as in the upper magnetic layer obtained in Example 4.

The thin film magnetic head exhibited excellent results in the heat test, i.e., had excellent reliability.

COMPARATIVE EXAMPLE 2

A thin film magnetic head was formed in the same manner as that in Example 1, except that condensation polymerization type polyimide precursor No. 1 as shown in Table 1 was dissolved in a solvent and the heat curing treatment was conducted in the air. Blistering, i.e. a film defect, occurred in the insulation layer because water molecules formed during the curing could not be removed. The thin film magnetic head was also poor in magnetic characteristics.

As is apparent from the foregoing detailed description, the present invention enabled not only the formation of an insulation layer having high homogeneity and high flatness but also the formation of a thin film magnetic head having excellent magnetic characteristics and free from film defect, i.e., having high reliability, with a high yield of production.

Since the structure of the interlayer insulation film according to the present invention has the abovementioned advantages, the present invention can also exhibit an excellent effect when it is used in a solid wiring structure prepared by laminating a plurality of the above-mentioned interlayer insulation films.

What is claimed is:

1. A thin film magnetic head comprising a first magnetic layer, an insulating gap layer provided over said first magnetic layer, a first insulation layer provided over said insulating gap layer, a conductor layer provided over said first insulation layer, an insulation portion comprising at least one insulation layer provided over said conductor layer and a second magnetic layer provided over said insulation portion, wherein at least an uppermost insulation layer of said insulation portion has a glass transition temperature of not less than 280° C. and is made of a product obtained by heat-curing a polyimide precursor represented by the following general formula (I) or a mixture of said polyimide precursor represented by the general formula (I) with a polyimide precursor represented by the following general formula (II):

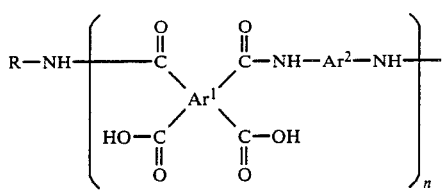  (I)

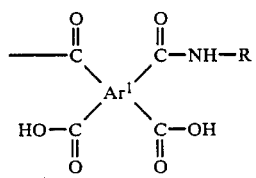

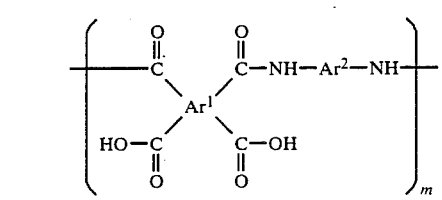  (II)

wherein $\overline{R}$ is at least one radical selected from among

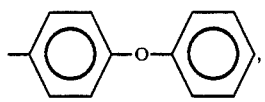,

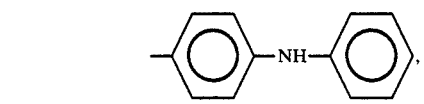,

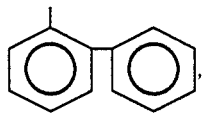,

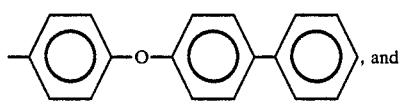, and

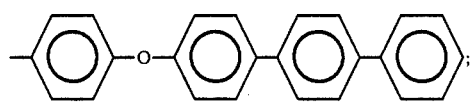;

$Ar^1$ is at least one radical selected from among

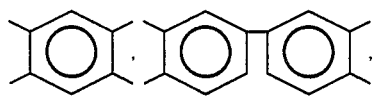,

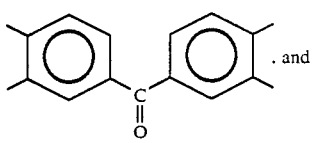, and

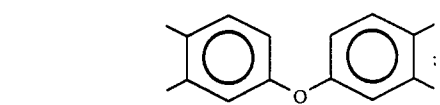;

$Ar^2$ is at least one radical selected from among

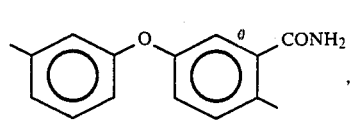,

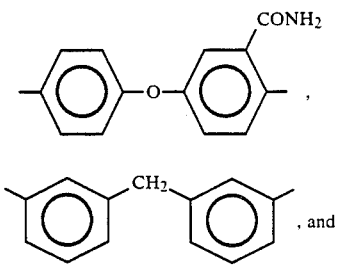,

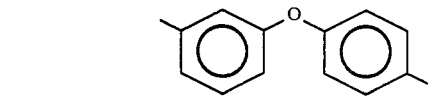, and

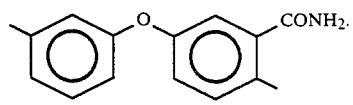;

n is an integer of 1 to 100; and m is an integer of 10 to 500. wherein said mixture has a mixing ratio in terms of weight ratio of solid content of the polyimide precursors represented by the following formula:

$$\left(\begin{array}{c}\text{polyimide precursor}\\ \text{represented by the}\\ \text{general formula (I)}\end{array}\right) \bigg/ \left(\begin{array}{c}\text{polyimide precursor}\\ \text{represented by the}\\ \text{general formula (II)}\end{array}\right) = 5/95 \text{ to } 95/5. \quad \text{(III)}$$

2. A thin film magnetic head according to claim 1, wherein at least said uppermost insulation layer is made of a product obtained by heat-curing said polyimide precursor represented by the general formula (I).

3. A thin film magnetic head according to claim 1, wherein at least said uppermost insulation layer is made of a product obtained by heat-curing said mixture.

4. A thin film magnetic head according to claim 3, wherein said weight ratio is 20/80 to 80/20.

5. A thin film magnetic head according to claim 3, wherein $Ar^2$ is a radical represented by the following formula:

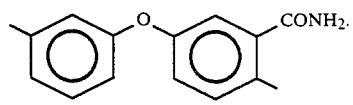

6. A thin film magnetic head according to claim 3, wherein $Ar^2$ is a radical represented by the following formula:

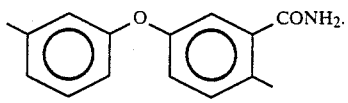

7. A thin film magnetic head according to claim 2, wherein Ar² is a radical represented by the following formula:

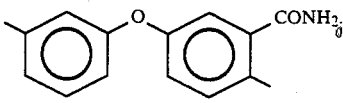

8. A thin film magnetic head according to claim 4, wherein Ar² is a radical represented by the following formula:

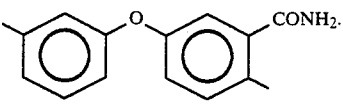

9. A thin film magnetic head according to claim 5, wherein Ar¹ includes at least a radical represented by the following formula:

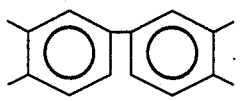

10. A thin film magnetic head according to claim 6, wherein Ar¹ includes at least a radical represented by the following formula:

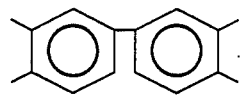

11. A thin film magnetic head according to claim 7, wherein Ar¹ includes at least a radical represented by the following formula:

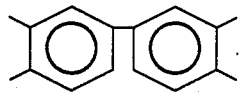

12. A thin film magnetic head according to claim 8, wherein Ar¹ includes at least a radical represented by the following formula:

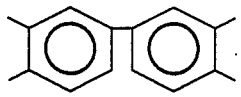

13. A thin film magnetic head according to claim 1, wherein said precursor or said polyimide mixture is heat-cured under a reduced pressure of 0.1 Pa or less.

14. A thin film magnetic head according to claim 2, wherein said precursor or said polyimide mixture is heat-cured under a reduced pressure of 0.1 Pa or less.

15. A thin film magnetic head according to claim 1, wherein said insulation portion comprises a plurality of insulation layers, wherein said insulation portion other than said uppermost insulation layer is made of a material different than said product of which said uppermost insulation layer is made, and wherein said uppermost insulation layer has a thickness of 1 to 4 μm.

16. A thin film magnetic head according to claim 1, wherein said uppermost insulation layer is formed by coating a varnish comprising said polyimide precursor represented by the general formula (I) or said mixture, and a solvent, and heat-curing said varnish.

17. A thin film magnetic head according to claim 16, wherein said varnish comprises 10 to 50% by weight of said polyimide precursor represented by the general formula (I) or said mixture.

* * * * *